United States Patent
Viswanathan et al.

(10) Patent No.: US 10,976,747 B2
(45) Date of Patent: Apr. 13, 2021

(54) METHOD AND APPARATUS FOR GENERATING A REPRESENTATION OF AN ENVIRONMENT

(71) Applicant: HERE Global B.V., Eindhoven (NL)

(72) Inventors: Anirudh Viswanathan, Berkeley, CA (US); Matt Mott, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 226 days.

(21) Appl. No.: 16/173,165

(22) Filed: Oct. 29, 2018

(65) Prior Publication Data

US 2020/0133294 A1    Apr. 30, 2020

(51) Int. Cl.
| | | |
|---|---|---|
| G05D 1/02 | (2020.01) | |
| G06F 16/29 | (2019.01) | |
| G01C 21/32 | (2006.01) | |
| G05D 1/00 | (2006.01) | |
| G06K 9/00 | (2006.01) | |

(52) U.S. Cl.
CPC ............ G05D 1/0246 (2013.01); G01C 21/32 (2013.01); G05D 1/0088 (2013.01); G06F 16/29 (2019.01); G06K 9/00798 (2013.01); G05D 2201/0213 (2013.01)

(58) Field of Classification Search
CPC ............... G05D 1/0246; G05D 1/0088; G05D 2201/0213; G06F 16/29; G01C 21/32; G06K 9/00798
See application file for complete search history.

(56) References Cited

U.S. PATENT DOCUMENTS

| | | | |
|---|---|---|---|
| 5,202,742 A * | 4/1993 | Frank | G01S 7/4811 356/5.1 |
| 5,892,855 A * | 4/1999 | Kakinanni | G06K 9/4633 348/119 |
| 9,401,028 B2 | 7/2016 | Kuehnle et al. | |
| 2007/0219720 A1* | 9/2007 | Trepagnier | G05D 1/0278 701/300 |
| 2009/0097038 A1* | 4/2009 | Higgins-Luthman | B60G 17/019 356/602 |
| 2009/0296987 A1* | 12/2009 | Kageyama | G06K 9/00798 382/103 |

(Continued)

OTHER PUBLICATIONS

Extended European Search Report for Application No. EP 19205665.3 dated Mar. 19, 2020, 9 pages.

(Continued)

Primary Examiner — Calvin Cheung
(74) Attorney, Agent, or Firm — Alston & Bird LLP

(57) ABSTRACT

A method is provided for generating a representation of an environment. Methods may include: determining location information of a vehicle including a road segment and a direction of travel; identifying features of the road segment based on sensor data from sensors carried by the vehicle; projecting the features of the road segment onto a ground plane of the road segment; defining bins across a width of the road segment; laterally positioning the defined bins relative to a determination of positions of the features of the road segment; consolidating detected features of each bin to define features of the road segment; and guiding an autonomous vehicle along the road segment based, at least in part, on the consolidated detected features of the road segment.

20 Claims, 7 Drawing Sheets

(56) References Cited

U.S. PATENT DOCUMENTS

| | | | | |
|---|---|---|---|---|
| 2010/0189306 | A1* | 7/2010 | Kageyama | G06K 9/00798 |
| | | | | 382/104 |
| 2011/0103648 | A1 | 5/2011 | Wiedemann et al. | |
| 2011/0234450 | A1* | 9/2011 | Sakai | G01S 17/42 |
| | | | | 342/70 |
| 2013/0120575 | A1* | 5/2013 | Byun | G06K 9/6289 |
| | | | | 348/148 |
| 2013/0253753 | A1* | 9/2013 | Burnette | G06K 9/00798 |
| | | | | 701/26 |
| 2014/0156178 | A1* | 6/2014 | Yoo | G01C 21/32 |
| | | | | 701/409 |
| 2015/0120244 | A1 | 4/2015 | Ma et al. | |
| 2015/0227800 | A1* | 8/2015 | Takemae | G06K 9/00798 |
| | | | | 382/104 |
| 2015/0371094 | A1* | 12/2015 | Gardiner | E01C 23/01 |
| | | | | 348/148 |
| 2016/0011594 | A1* | 1/2016 | Chung | G06K 9/6234 |
| | | | | 701/28 |
| 2016/0161265 | A1* | 6/2016 | Bagheri | G01C 21/32 |
| | | | | 701/450 |
| 2016/0171314 | A1 | 6/2016 | Shao | |
| 2016/0356001 | A1* | 12/2016 | Shimada | G06K 9/00798 |
| 2017/0008562 | A1* | 1/2017 | Shashua | G01C 21/3476 |
| 2017/0039436 | A1 | 2/2017 | Chen et al. | |
| 2017/0144669 | A1* | 5/2017 | Spata | E01C 23/01 |
| 2017/0371348 | A1* | 12/2017 | Mou | G01S 17/86 |
| 2018/0068495 | A1* | 3/2018 | Chainer | B60R 11/04 |
| 2018/0129887 | A1 | 5/2018 | Kang et al. | |
| 2018/0148900 | A1* | 5/2018 | Rohrbaugh | E01H 1/053 |
| 2018/0224863 | A1* | 8/2018 | Fu | G06T 7/11 |
| 2018/0293466 | A1 | 10/2018 | Viswanathan | |
| 2018/0321686 | A1* | 11/2018 | Kanzawa | G08G 1/166 |
| 2019/0107400 | A1* | 4/2019 | Zavodny | B60W 40/06 |
| 2019/0118705 | A1* | 4/2019 | Yu | G08G 1/166 |
| 2019/0120967 | A1* | 4/2019 | Smits | G01C 21/3626 |
| 2019/0164018 | A1* | 5/2019 | Zhu | G06T 7/11 |
| 2019/0212747 | A1* | 7/2019 | Berkemeier | G05D 1/0278 |
| 2020/0074413 | A1* | 3/2020 | Yonekawa | G06Q 10/20 |

OTHER PUBLICATIONS

Xuan, H. et al., *Robust Lane-Mark Extraction for Autonomous Driving Under Complex Real Conditions* published Aug. 2, 2017; IEEE Access, vol. 6 (2018) 5749-5765.

Road Lane Lines Detection Using Advanced Computer Vision Techniques [online] [retrieved Jan. 10, 2019]. Retrieved from the Internet: <URL: https://towardsdatascience.com/advanced-lane-finding-using-computer-vision-techniques-7f3230b6c6f2>. (dated Mar. 26, 2017) 10 pages.

Finding Lane Lines With Image Processing [online] [retrieved Jan. 10, 2019]. Retrieved from the Internet: <URL: https://cmlpr.github.io/blog/2017/03/14/advanced-lane-lines>. (dated Mar. 14, 2017) 9 pages.

\* cited by examiner

METHOD AND APPARATUS FOR GENERATING A REPRESENTATION OF AN ENVIRONMENT

TECHNOLOGICAL FIELD

Example embodiments of the present invention relate generally to generating a representation of an environment, and more particularly, to using a binning strategy to consolidate features detected across multiple images or sensor readings into cohesive objects or features within the environment.

BACKGROUND

Road geometry modelling is very useful for three dimensional (3D) map creation and 3D terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern day applications (e.g., 3D mapping, terrain identification, or the like) require the analysis of large amounts of data, and therefore are not practical without quicker or less costly techniques.

Some current methods rely upon feature detection from image data to perform road terrain and feature detection, but these methods have deficiencies. For instance, some systems designed for terrain and feature detection around a vehicle exist, but may be unreliable. Further, the reliability of feature detection may not be known such that erroneous feature detection or lack of feature detection may adversely impact autonomous or semi-autonomous driving.

BRIEF SUMMARY

Accordingly, a method, apparatus, and computer program product are provided for generating a representation of an environment through consolidation of detected features of a road segment of the environment. In an example embodiment, a method, apparatus and computer program product are provided that establish the features of a road segment for use in guiding autonomous or semi-autonomous vehicles along the road segment.

In a first example embodiment, an apparatus is provided including at least one processor and at least one memory including computer program code. The at least one memory and the computer program code may be configured to, with the at least one processor, cause the apparatus to: determine location information of a vehicle including a road segment and a direction of travel; identify features of the road segment based on sensor data from sensors carried by the vehicle; project the features of the road segment onto a ground plane of the road segment; define bins across a width of the road segment; laterally position the defined bins relative to a determination of positions of the features of the road segment; consolidate detected features of each bin to define features of the road segment; and guide an autonomous vehicle along the road segment based, at least in part, on the consolidated detected features of the road segment.

Causing the apparatus of some example embodiments to identify features of the road segment may include causing the apparatus to receive sensor input from at least one sensor including an image sensor or a distance sensor. Causing the apparatus to project the features of the road segment onto the ground plane may include causing the apparatus to use a pre-defined homography determined, based at least in part, on the at least one sensor position relative to the ground plane to project features of the road segment onto the ground plane. The identified features of the road segment may include lane lines. Each defined bin may include a width approximating a conventional road segment lane width, which may be a width of about 3.0 meters to about 4.2 meters. Causing the apparatus to laterally position the defined bins relative to a determination of positions of the features of the road segment may include causing the apparatus to laterally position the defined bins relative to a determination of initial lane segments. Consolidated detected features of each bin may include lane lines.

Embodiments described herein may provide a computer program product including at least one non-transitory computer-readable storage medium having computer-executable program code instructions stored therein. The computer-executable program code instructions may include program code instructions to: determine location information of a vehicle including a road segment and a direction of travel; identify features of the road segment based on sensor data from sensors carried by the vehicle; project the features of the road segment onto a ground plane of the road segment; define bins across a width of the road segment; laterally position the defined bins relative to a determination of positions of the features of the road segment; consolidate detected features of each bin to define features of the road segment; and guide an autonomous vehicle along the road segment based, at least in part, on the consolidated detected features of the road segment.

According to some embodiments, the program code instructions to identify features of the road segment may include program code instructions to receive sensor input from at least one sensor including an image sensor or a distance sensor. The program code instructions to project the features of the road segment onto the ground plane may include program code instructions to use a pre-defined homography determined based, at least in part, on the at least one sensor position relative to the ground plane to project features of the road segment onto the ground plane. The identified features of the road segment may include lane lines. Each defined bin may include a width approximating a conventional road segment lane width, which may be defined as about 3.0 meters to about 4.2 meters. The program code instructions to laterally position the defined bins relative to a determination of positions of the features of the road segment may include program code instructions to laterally position the defined bins relative to a determination of the initial lane segments. The consolidated detected features of each bin may include lane lines.

Embodiments described herein may provide a method. Methods may include: determining location information of a vehicle including a road segment and a direction of travel; identifying features of the road segment based on sensor data from sensors carried by the vehicle; projecting the features of the road segment onto a ground plane of the road segment; defining bins across a width of the road segment; laterally positioning the defined bins relative to a determination of positions of the features of the road segment; consolidating detected features of each bin to define features of the road segment; and guiding an autonomous vehicle along the road segment based, at least in part, on the consolidated detected features of the road segment.

According to some embodiments, identifying features of the road segment may include receiving sensor input from at least one sensor including an image sensor or a distance sensor. Projecting the features of the road segment onto the ground plane may include using a predefined homography determined based, at least in part, on the at least one sensor position relative to the ground plane to project features of the road segment onto the ground plane. The identified features of the road segment may include lane lines.

Embodiments described herein may provide an apparatus. The apparatus of example embodiments may include: means for determining location information of a vehicle including a road segment and a direction of travel; means for identifying features of the road segment based on sensor data from sensors carried by the vehicle; means for projecting the features of the road segment onto a ground plane of the road segment; means for defining bins across a width of the road segment; means for laterally positioning the defined bins relative to a determination of positions of the features of the road segment; means for consolidating detected features of each bin to define features of the road segment; and means for guiding an autonomous vehicle along the road segment based, at least in part, on the consolidated detected features of the road segment.

According to some embodiments, the means for identifying features of the road segment may include means for receiving sensor input from at least one sensor including an image sensor or a distance sensor. The means for projecting the features of the road segment onto the ground plane may include means for using a predefined homography determined based, at least in part, on the at least one sensor position relative to the ground plane to project features of the road segment onto the ground plane. The identified features of the road segment may include lane lines.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
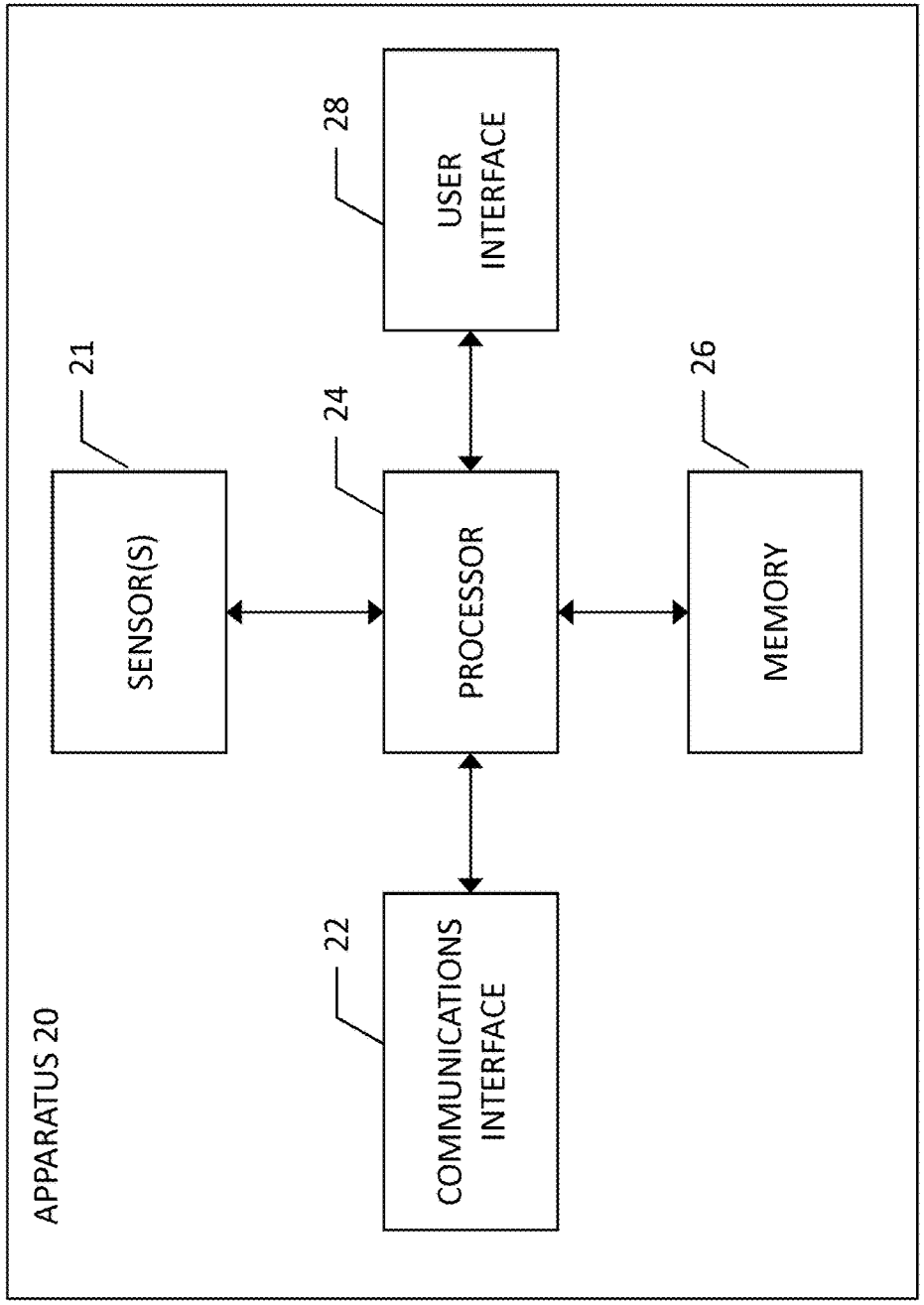
Figure 2:
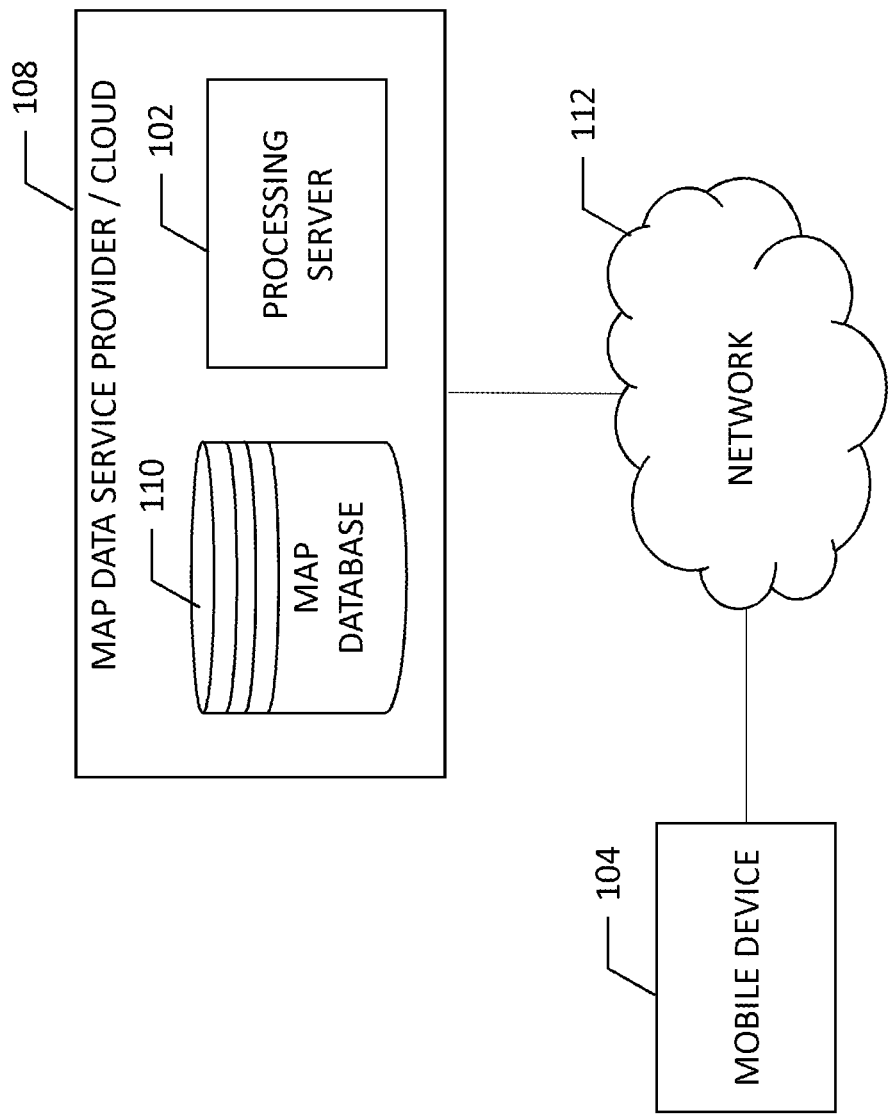
Figure 3:
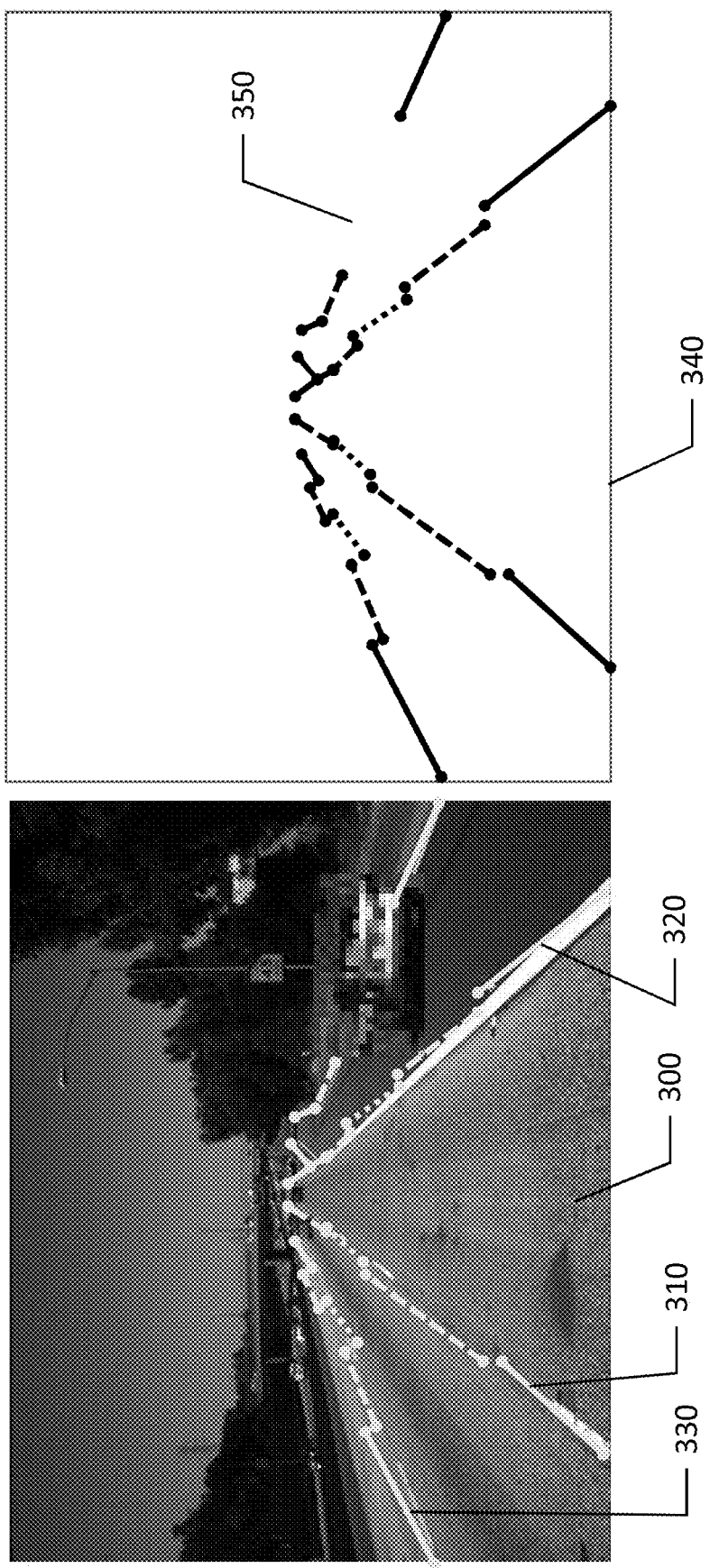
Figure 4:
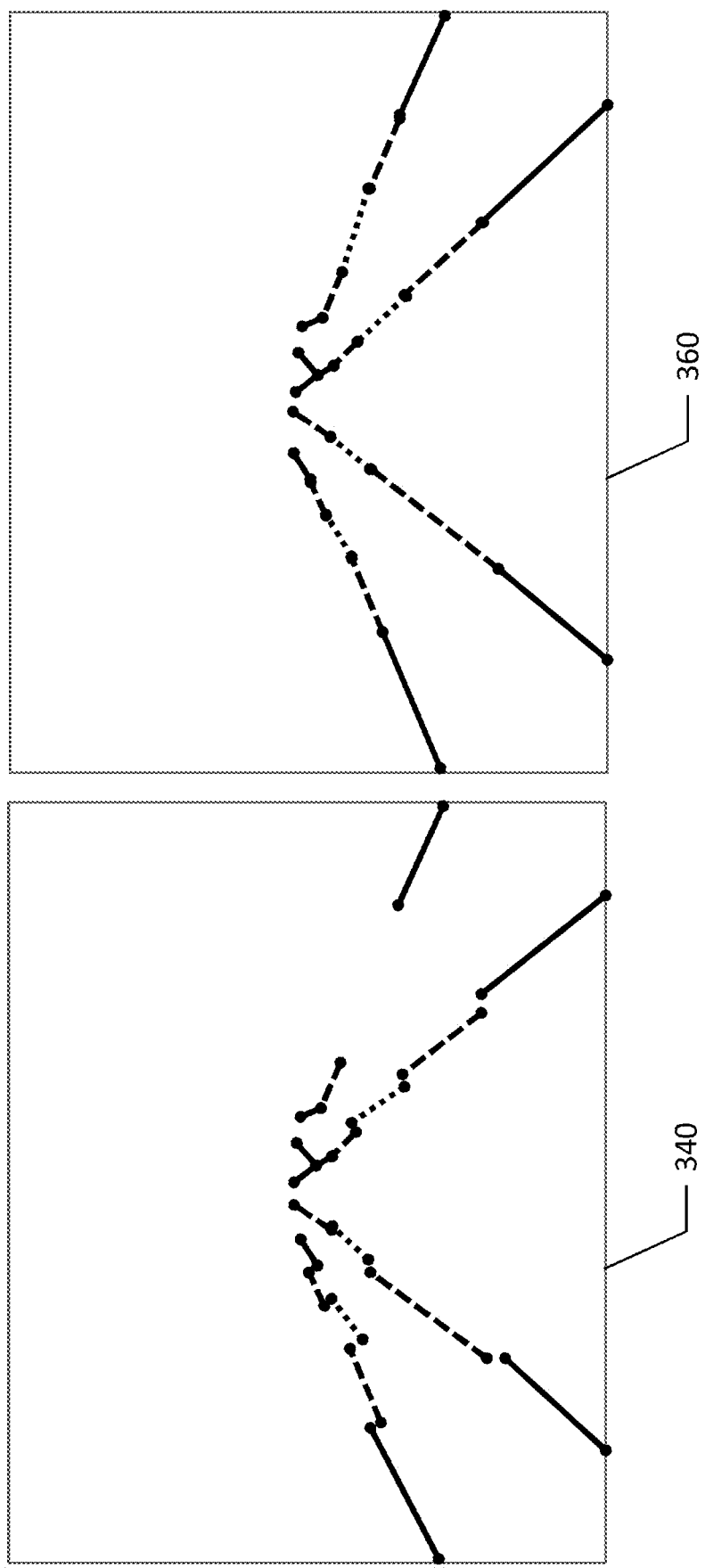
Figure 5:
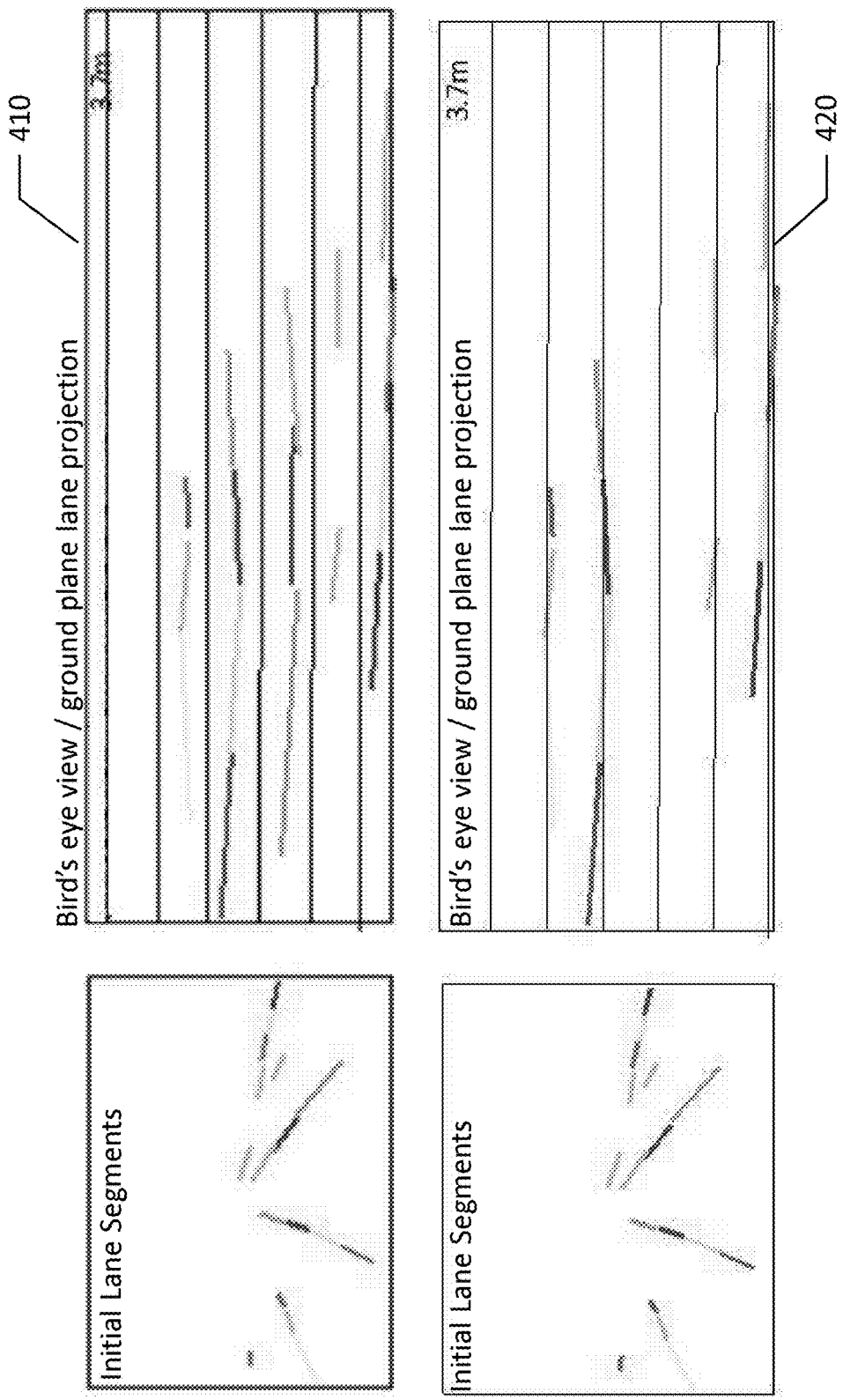
Figure 6:
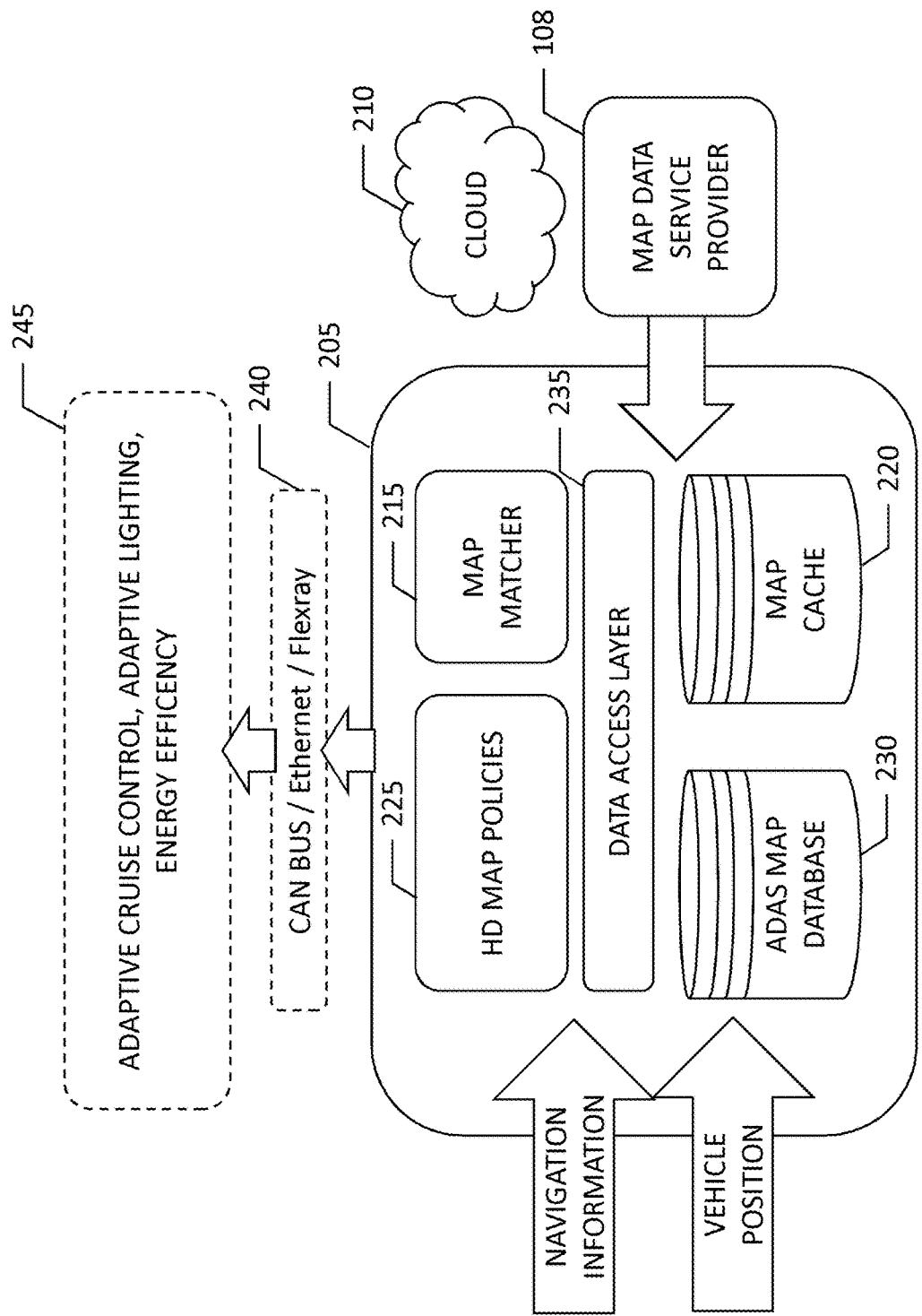
Figure 7:
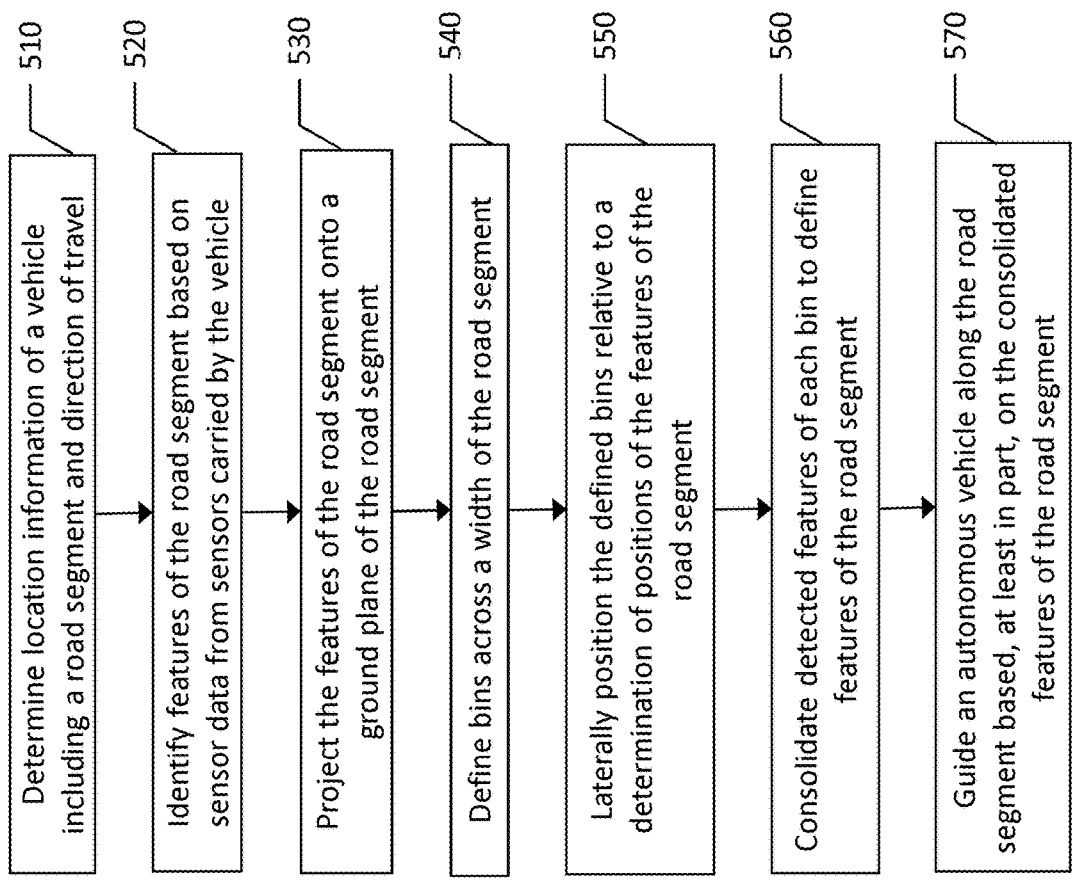

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for generating a representation of an environment to an example embodiment of the present disclosure;

FIG. 3 illustrates the detection of a plurality of lane lines in lane line segments according to an example embodiment of the present disclosure;

FIG. 4 illustrates the consolidation of the lane line segments resulting from example embodiments of the present disclosure;

FIG. 5 depicts the bins generated and moved to capture the detected features of an environment according to an example embodiment of the present disclosure;

FIG. 6 is a block diagram of a system for implementing the methods described herein for generating a representation of an environment according to an example embodiment of the present disclosure; and FIG. 7 is a flowchart of operations for generating a representation of an environment according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for facilitating autonomous and semi-autonomous driving in an environment. Autonomous vehicles leverage sensor information relating to roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control.

HD maps have a high precision at resolutions that may be down to a several centimeters that identify objects proximate a road segment, features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Autonomous vehicles or vehicles with some level of autonomous controls provide some degree of vehicle control that was previously performed by a person driving a vehicle. Removing some or all of the responsibilities of driving from a person and automating those responsibilities require a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpreting those signals, and providing vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Autonomous and semi-autonomous vehicles may use a variety of sensors to facilitate various autonomous functions. For example, adaptive cruise control functionality that maintains a following distance from a lead vehicle, and maintains a near-constant speed when not following another vehicle, requires at least sensors (e.g., sensors 21 of FIG. 1) that can detect a vehicle in front of the autonomous or semi-autonomous vehicle. Such a sensor may be a distance sensor such as LiDAR or other sensor having similar capabilities. Further, the autonomous or semi-autonomous vehicle must be equipped with control capabilities to facilitate braking of the vehicle and accelerating the vehicle. This sensor and control system may be a "sensor package" or level of sensor capabilities. Adaptive cruise control has become relatively common, such that a sensor package capable of adaptive cruise control may be a relatively rudimentary level of sensor capabilities relative to a vehicle that has full autonomous control.

Beyond adaptive cruise control, vehicles with more autonomy may be able to navigate roadways through lane changes, turns, stopping, starting, and generally performing all features of conventional driving that historically have been performed manually by a driver. In order to facilitate full autonomy, vehicles require a level of sensor capabilities that can identify road geometry, lane lines, other vehicles, pedestrians, objects in or proximate the roadway, signs, road anomalies (e.g., temporary construction barricades), etc. Such an advanced sensor package having a high level of sensor capabilities may be capable of full autonomous control of a vehicle in a manner that substantially replaces the driver. It is also appreciated that any degree of autonomy between no autonomy and full autonomy is also possible based on a sensor package installed in a vehicle or carried with a vehicle and a level of sensor capabilities of the sensor package.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

The map database 110 of example embodiments including the HD maps of a geographic region may be generated from a plurality of different sources of data. For example, municipalities or transportation departments may provide map data relating to road ways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology such as a Global Positioning System may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

According to example embodiments described herein, the role of HD maps in facilitating autonomous or semi-autonomous vehicle control may include crowd-sourced building of the maps to identify and confirm features of the maps. In the context of map-making, the features from the environment may be detected by a vehicle traveling along a road segment and consolidated to form a representation of the actual real-world environment in the form of a map. Embodiments described herein include a method, apparatus, and computer program product to use noisy detection results on raw sensor data to perform efficient consolidation and minimize any domain-specific knowledge on the detections to generate the map.

Vehicles traveling along a road segment may be equipped with sensors, such as sensors 21 of apparatus 20 of FIG. 1, where the sensors may include image sensors or distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith. The output of a detection module or a perception module may be performed on a per-frame basis if an image sensor or camera is a sensor used, or at a sampling rate of a sensor in the case of a LiDAR sensor or similar. As the output is periodic, even when the period is very short, the detection results may be noisy and may detect features in the environment which may not be consolidated across frames or identified to belong to the same object in the environment. This may be due, in part, to the speed at which a vehicle carrying the detection module is moving and/or other objects within the detection zone that may not be part of the roadway, such as vehicles moving along the road segment in traffic.

An example embodiment of the noisy data obtained from a detection module is illustrated in FIG. 3 which illustrates periodic collection of sensor data (e.g., by image frames or by sensor sampling rate) where the lane lines 310, 320, and 330 of a roadway 300 are captured by the detection module. As shown, where physical reality may correspond to three lanes and four lane lines in the observed field of view of the sensor, the detection module may perceive hundreds of disjointed lane detections at the same location. Image 340 of FIG. 3 depicts the lane lines as detected by the detection module with the image of the environment removed, which can be seen as a plurality of broken lane segments and a period of lane occlusion by a car 350 where the lane line does not appear. The broken lane segments are shown in different broken line patterns merely to illustrate different lane line segments and has no relation to the underlying lane line type. Similarly, the end points of the lane line segments are depicted as round end points to clarify the beginning and end of the broken lane line segments.

Conventionally, a model-based approach may be used for consolidation of detections in that the detected segments are force-fit together to a representation of the real world with three or four lane lines. The model based approach may prove satisfactory for linear or quadratic shaped elements, but is generally unsatisfactory when the lane geometry detected does not fit into a pre-defined library of possible lane shapes. Embodiments described herein use a model-free technique for feature consolidation such as lane lines.

Embodiments described herein use an adaptive binning strategy to consolidate detected features such as lane segments, within and across frames or sensor samples. The binning strategy described herein enables unambiguous consolidation even in the case where the lane geometry does not correspond to pre-existing types. FIG. 4 illustrates an example of the sensor data received in image 340 and the output of the binning method described herein in image 360 after consolidation of the lane lines detected by the sensors.

In order to implement the methods described herein, features detected along the road segment through the sensors of the detection module are first projected onto the ground plane. In order to project the features onto the ground plane, a pre-defined homography may be used that can be established based on the position of the sensor(s) of the detection module on the vehicle relative to the ground plane. When the feature data is projected onto the ground plane, bins may be defined across the width of the road segment. In the instance of lane line detection, the bins may be defined as about the width of the detected lanes or using a conventional lane width which may range from about 3.0 meters to about 4.2 meters. The bins may be in a window that is able to move without constraint to determine the most appropriate binning locations—where the bins contain the desired features. The most appropriate binning location may include where the number of lane segments within the bin is maximized. FIG. 5 illustrates an example embodiment in which initial lane segments are identified and bins are established at 3.7 meters wide. In plot 410, the lane line segments that are projected onto the ground plane using the predefined homography are within the bins. Sliding the bin windows laterally across the width of the road segment allows for the lane lines in plot 420 to be aligned with the bins that are established at lane width for the road segment. Lane lines that are along the same bin boundary may be consolidated to form a contiguous lane line more accurately representative of the lane lines of the road segment.

According to another example embodiment described herein, a directed optimization method may be used to establish bin centers. Each lane detection segment may be projected onto the perpendicular axis. A mixture of Gaussians method may be used to estimate the number of lanes for the road segment, and the bin center may be at the mean for each Gaussian distribution.

FIG. 6 illustrates an example embodiment of an architecture specifically configured for implementing embodiments described herein. The illustrated embodiment of FIG. 6 may be vehicle-based, where information regarding map data is provided via a map data service provider 108 and vehicle position along with navigation information is established based on data received at the vehicle. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and uses that information to map-match 215 the position to a road link on a map of the mapped network of roads stored in the map cache 220. This link or segment, along with the direction of travel, is used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

FIG. 7 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 7 is a flowchart of a method for generating a representation of an environment, and more particularly, to using a binning strategy to consolidate features detected across multiple images or sensor readings into cohesive objects or features within an environment. As shown, location information of a vehicle including a road segment and a direction of travel are determined at 510. Features of the road segment are identified at 520 based on sensor data from sensors carried by the vehicle. Features of the road segment are projected onto a ground plane of the road segment at 530. Bins are defined at 540 across a width of the road segment. The defined bins are laterally positioned at 550 relative to a determination of positions of the features of the road segment. Detected features of each bin are consolidated to define features of the road segment at 560. Based, at least in part on the consolidated features of the road segment, an autonomous or semi-autonomous vehicle is guided along the road segment.

In an example embodiment, an apparatus for performing the method of FIG. 7 above may comprise a processor (e.g., the processor 24) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or func- That which is claimed:

1. An apparatus to facilitate autonomous or semi-autonomous control of a vehicle comprising at least one processor and at least one non-transitory memory including computer program code instructions, the computer program code instructions configured to, when executed, cause the apparatus to at least:
   determine location information of the vehicle including a road segment and a direction of travel;
   identify features of the road segment based on sensor data from sensors carried by the vehicle;
   project the features of the road segment onto a ground plane of the road segment;
   define bins across a width of the road segment;
   laterally position the defined bins relative to a determination of positions of the features of the road segment;
   consolidate detected features of each bin to define features of the road segment; and
   guide an autonomous or semi-autonomous vehicle along the road segment based, at least in part, on the consolidated detected features of the road segment.

2. The apparatus of claim 1, wherein causing the apparatus to identify features of the road segment comprises causing the apparatus to receive sensor input from at least one sensor comprising an image sensor or a distance sensor.

3. The apparatus of claim 2, wherein causing the apparatus to project the features of the road segment onto the ground plane comprises causing the apparatus to use a pre-defined homography determined based, at least in part, on the at least one sensor position relative to the ground plane to project features of the road segment onto the ground plane.

4. The apparatus of claim 1, wherein the identified features of the road segment comprise lane lines.

5. The apparatus of claim 4, wherein each defined bin comprises a width approximating a conventional road segment lane width.

6. The apparatus of claim 5, wherein each defined bin width is about 3.0 meters to about 4.2 meters.

7. The apparatus of claim 5, wherein causing the apparatus to laterally position the defined bins relative to a determination of positions of the features of the road segment comprises causing the apparatus to laterally position the defined bins relative to a determination of initial lane segments.

8. The apparatus of claim 7, wherein consolidated detected features of each bin comprise lane lines.

9. A computer program product comprising at least one non-transitory computer-readable storage medium having computer-executable program code instructions stored therein, the computer-executable program code instructions comprising program code instructions to:
   determine location information of a vehicle including a road segment and a direction of travel;
   identify features of the road segment based on sensor data from sensors carried by the vehicle;
   project the features of the road segment onto a ground plane of the road segment;
   define bins across a width of the road segment;
   laterally position the defined bins relative to a determination of positions of the features of the road segment;
   consolidate detected features of each bin to define features of the road segment; and
   guide an autonomous or semi-autonomous vehicle along the road segment based, at least in part, on the consolidated detected features of the road segment.

10. The computer program product of claim 9, wherein the program code instructions to identify features of the road segment comprise program code instructions to receive sensor input from at least one sensor comprising an image sensor or a distance sensor.

11. The computer program product of claim 10, wherein the program code instructions to project the features of the road segment onto the ground plane comprise program code instructions to use a pre-defined homography determined based, at least in part, on the at least one sensor position relative to the ground plane to project features of the road segment onto the ground plane.

12. The computer program product of claim 9, wherein the identified features of the road segment comprise lane lines.

13. The computer program product of claim 12, wherein each defined bin comprises a width approximating a conventional road segment lane width.

14. The computer program product of claim 13, wherein each defined bin width is about 3.0 meters to about 4.2 meters.

15. The computer program product of claim 14, wherein the program code instructions to laterally position the defined bins relative to a determination of positions of the features of the road segment comprise program code instructions to laterally position the defined bins relative to a determination of initial lane segments.

16. The computer program product of claim 15, wherein consolidated detected features of each bin comprise lane lines.

17. A method comprising:
   determining location information of a vehicle including a road segment and a direction of travel;
   identifying features of the road segment based on sensor data from sensors carried by the vehicle;
   projecting the features of the road segment onto a ground plane of the road segment;
   defining bins across a width of the road segment;
   laterally positioning the defined bins relative to a determination of positions of the features of the road segment;
   consolidating detected features of each bin to define features of the road segment; and
   guiding an autonomous or semi-autonomous vehicle along the road segment based, at least in part, on the consolidated detected features of the road segment.

18. The method of claim 17, wherein identifying features of the road segment comprises receiving sensor input from at least one sensor comprising an image sensor or a distance sensor.

19. The method of claim 18, wherein projecting the features of the road segment onto the ground plane comprises using a pre-defined homography determined based, at least in part, on the at least one sensor position relative to the ground plane to project features of the road segment onto the ground plane.

20. The method of claim 17, wherein the identified features of the road segment comprise lane lines.

* * * * *